US010378113B2

(12) United States Patent
Yan et al.

(10) Patent No.: US 10,378,113 B2
(45) Date of Patent: Aug. 13, 2019

(54) METHOD FOR PREPARING THREE-DIMENSIONAL POROUS GRAPHENE MATERIAL

(71) Applicant: Huazhong University of Science and Technology, Wuhan (CN)

(72) Inventors: Chunze Yan, Wuhan (CN); Yusheng Shi, Wuhan (CN); Wei Zhu, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 271 days.

(21) Appl. No.: 15/614,574

(22) Filed: Jun. 5, 2017

(65) Prior Publication Data

US 2017/0267533 A1 Sep. 21, 2017

Related U.S. Application Data

(63) Continuation-in-part of application No. PCT/CN2015/075960, filed on Apr. 7, 2015.

(30) Foreign Application Priority Data

Dec. 25, 2014 (CN) .......................... 2014 1 0826636

(51) Int. Cl.

| | |
|---|---|
| ***C23F 4/04*** | (2006.01) |
| ***B33Y 10/00*** | (2015.01) |
| ***C01B 32/186*** | (2017.01) |
| ***C01B 32/184*** | (2017.01) |
| ***C01B 32/194*** | (2017.01) |

(52) U.S. Cl.

CPC ................ *C23F 4/04* (2013.01); *B33Y 10/00* (2014.12); *C01B 32/184* (2017.08); *C01B 32/186* (2017.08); *C01B 32/194* (2017.08); *C01B 2204/32* (2013.01); *C01P 2006/12* (2013.01);

(Continued)

(58) Field of Classification Search

None

See application file for complete search history.

(56) References Cited

PUBLICATIONS

Ye et al.; Deposition of Three-Dimensional Graphene Aerogel on Nickel Foam as a Binder-Free Supercapacitor Electrode; Applied Materials & Interfaces; 2013, 5, 7122-7129.*

* cited by examiner

*Primary Examiner* — Michael P. Rodriguez

(74) *Attorney, Agent, or Firm* — Matthias Scholl P.C.; Matthias Scholl

(57) ABSTRACT

A method for preparing a three-dimensional porous graphene material, including: a) constructing a CAD model corresponding to a required three-dimensional porous structure, and designing an external shape and internal structure parameters of the model; b) based on the CAD model, preparing a three-dimensional porous metal structure using a metal powder as material; c) heating the three-dimensional porous metal structure and preparing a metal template of the required three-dimensional porous structure; d) placing the metal template in a tube furnace and heating the metal template to a temperature of between 800 and 1000° C.; standing for 0.5-1 hr, introducing a carbon source to the tube furnace for continued reaction, cooling resulting products to room temperature to yield a three-dimensional graphene grown on the metal template; and e) preparing a corrosive solution, and immersing the three-dimensional graphene in the corrosive solution.

12 Claims, 1 Drawing Sheet

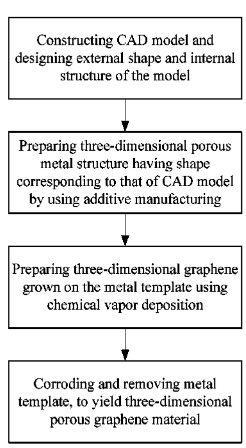

(52) U.S. Cl.
CPC ...... *C01P 2006/14* (2013.01); *C01P 2006/16* (2013.01)

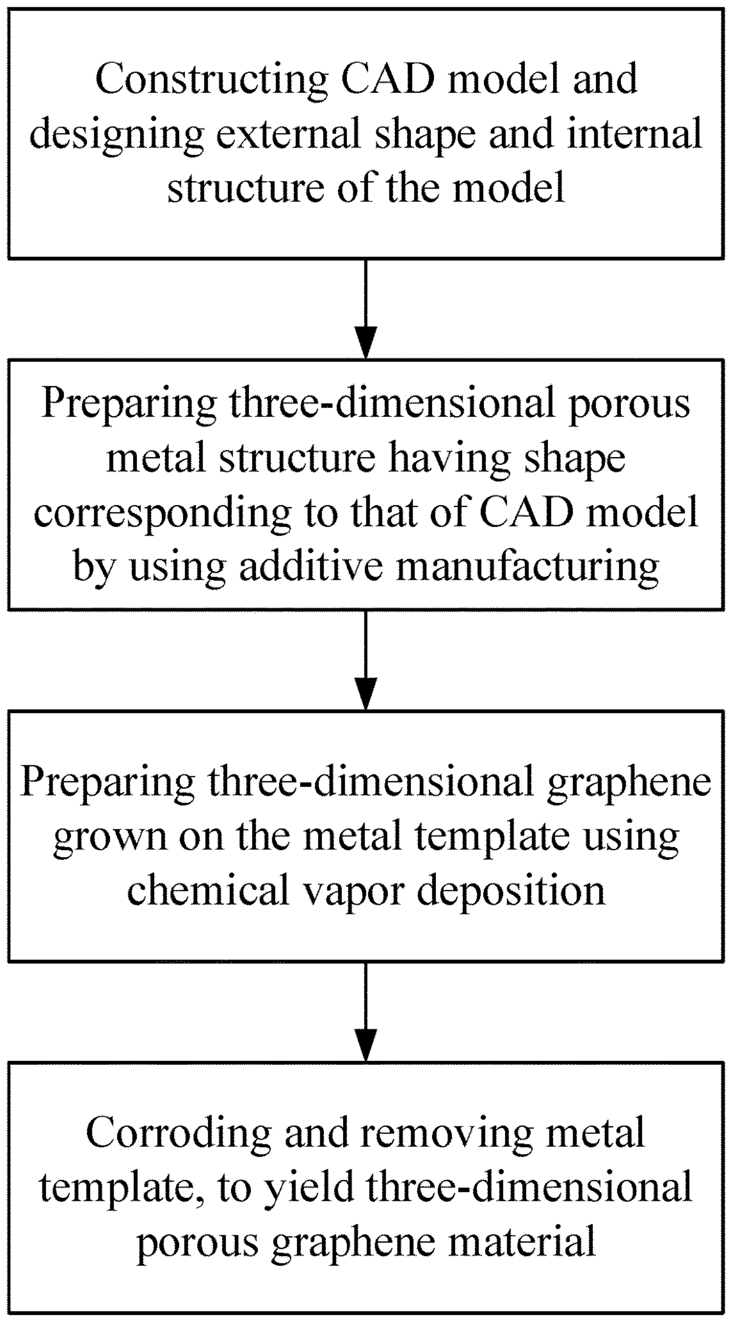
Constructing CAD model and designing external shape and internal structure of the model
Preparing three-dimensional porous metal structure having shape corresponding to that of CAD model by using additive manufacturing
Preparing three-dimensional graphene grown on the metal template using chemical vapor deposition
Corroding and removing metal template, to yield three-dimensional porous graphene material

METHOD FOR PREPARING THREE-DIMENSIONAL POROUS GRAPHENE MATERIAL

CROSS-REFERENCE TO RELATED APPLICATIONS

This application is a continuation-in-part of International Patent Application No. PCT/CN2015/075960 with an international filing date of Apr. 7, 2015, designating the United States, now pending, and further claims foreign priority benefits to Chinese Patent Application No. 201410826636.1 filed Dec. 25, 2014. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a method for preparing a three-dimensional porous graphene material.

Description of the Related Art

Graphene is an allotrope of carbon in the form of a two-dimensional, atomic-scale, hexagonal lattice in which one atom forms each vertex. Three-dimensional (3D) graphene materials have high specific surface areas, high mechanical strengths and fast mass and electron transport kinetics. As such, they can potentially find applications in fields such as energy storage, filtration, thermal management, and biomedical devices and implants.

Typical methods for manufacturing 3D graphene materials include loading graphene on a metal or non-metal substrate. However, subject to the shape and structure of the substrate, the internal structure parameters of 3D materials including pore size, porosity, and pore shape, and external shape cannot be specifically controlled.

SUMMARY OF THE INVENTION

In view of the above-described problems, it is one objective of the invention to provide a method for preparing a three-dimensional porous graphene material. The method can effectively control the manufacturing process of the three-dimensional porous metal template and the growth of the graphene, achieving the specific control of the external shape and the internal structure of the final products. Besides, the method has a relatively short manufacturing period, thus improving the production efficiency.

To achieve the above objective, in accordance with one embodiment of the invention, there is provided a method for preparing a three-dimensional porous graphene material. The method comprises:

a) constructing a CAD model corresponding to a required three-dimensional porous structure, and designing an external shape and internal structure parameters of the model comprising: a pore size, a porosity, and a pore shape, respectively;

b) based on the CAD model constructed in a), preparing, by using additive manufacturing in the presence of an inert gas, a three-dimensional porous metal structure having a shape corresponding to that of the CAD model with a metal powder as material, where, the metal powder is nickel, copper, iron, or cobalt, an average particle size of the metal powder is 5-50 μm, and a particle shape of the metal powder is spherical or approximately spherical;

c) heating the three-dimensional porous metal structure to a temperature of 900° C.-1500° C. for 4-24 hrs in the presence of the inert gas, cooling the three-dimensional porous metal structure to room temperature; performing sand blasting and ultrasonic cleaning on the three-dimensional porous metal structure, to acquire a metal template of the required three-dimensional porous structure;

d) placing the metal template in a tube furnace in the presence of mixed gases of the inert gas and hydrogen and heating the metal template to 800-1000° C.; standing for 0.5-1 hr, introducing a carbon source to the tube furnace for continued reaction, cooling resulting products to room temperature in the presence of the inert gas to yield a three-dimensional graphene grown on the metal template; and e) preparing a corrosive solution having a molar concentration of 1-3 mol/L; immersing the three-dimensional graphene prepared in d) in the corrosive solution, refluxing the corrosive solution at 60-90° C. until the metal template is completely melted; washing and drying the three-dimensional graphene to yield a three-dimensional porous graphene material, where, internal structure parameters comprising a pore size, a porosity, and a pore shape and external shape of the three-dimensional porous graphene material are the same as those of the CAD model constructed in a).

In a class of this embodiment, in a), the CAD model is a periodic ordered porous structure or an interconnected disordered three-dimensional porous structure, a unit dimension is between 0.5-10 mm, and a porosity is adjustable within a range of 20-90%.

In a class of this embodiment, the additive manufacturing in b) comprises selective laser melting technique, direct metal laser sintering technique, or electron beam melting technique; and an average particle size of the metal powder is controlled within 10-30 μm.

In a class of this embodiment, in c), the three-dimensional porous metal structure is heated to 1200-1370° C. in the presence of argon, maintained for 12 hrs, and then cooled to room temperature.

In a class of this embodiment, in d), the carbon source is selected from the group consisting of styrene, methane, and ethane; a flow rate of the carbon source is controlled at 0.2-200 mL/h; and a charging time of the carbon source lasts for 0.5-3 hrs.

In a class of this embodiment, the inert gas is argon, a volume ratio of the argon to the hydrogen is between 1:1 and 3:1; in the mixed gases of the argon and the hydrogen, a flow rate of the argon is controlled at 100-200 mL/min, and a flow rate of the hydrogen is controlled at 180-250 mL/min.

In a class of this embodiment, in e), the corrosive solution is selected from the group consisting of hydrochloric acid, sulfuric acid, nitric acid, iron chloride, and a mixture thereof.

Advantages of the method for preparing the three-dimensional porous graphene material according to embodiments of the invention are summarized as follows:

1. By constructing the CAD model and adopting the additive manufacturing to process the corresponding metal template, the three-dimensional grapheme macro-structure that satisfies different kinds of indicators can be acquired according to the requirement. Besides, the internal structure parameters including the pore size, the porosity, and the pore shape and the complicate external shape can be designed, thus correspondingly overcoming the defects that the prior art is unable to effectively control the structure and the performance of the three-dimensional grapheme.
2. By studying the critical processes including the prototyping manufacturing of the metal template, the growing of the graphene on the metal template, and the removal of the metal template by corrosion, particularly by designing the important reaction parameters and the reaction conditions involved in such processes, the method of the invention is capable of completely replicate the three-dimensional porous graphene material corresponding to the CAD model.
3. The raw materials for the method has extensive sources, environmental protection, low production cost, and low energy consumption; in the meanwhile, the method of the invention has the characteristics of easy control, short manufacture period, high yield, and high degree of freedom in design. Therefore, the method of the invention is suitable for the large scale production of three-dimensional graphene porous products possessing high qualities, advanced structures, and multiple functions.

BRIEF DESCRIPTION OF THE DRAWINGS

The invention is described hereinbelow with reference to accompanying drawings, in which the sole FIGURE is a flow chart illustrating a method for preparing a three-dimensional porous graphene material in accordance with one embodiment of the invention.

DETAILED DESCRIPTION OF THE EMBODIMENTS

For further illustrating the invention, experiments detailing a method for preparing a three-dimensional porous graphene material are described below. It should be noted that the following examples are intended to describe and not to limit the invention.

Example 1

Firstly, a three-dimensional porous unit cell having a unit size of 0.5 mm was constructed, for example, adopting CAD software. An array of the unit cell is designed to be a periodic porous structure in an ordered arrangement having a porosity of 50%.

Thereafter, pure nickel powder having a particle size within a range of 5-20 μm was screened. The outline of the powder particle was approximately spherical. A fiber laser was adopted as an energy source. Parameters were set as follows: a laser power of 200 W, a scanning speed of 500 mm/s, a thickness of 0.01 mm, a scanning interval of 0.08 mm. In the presence of the argon, the selective laser melting technique was adopted to form a three-dimension porous nickel structure having a dimension of 20×20×10 $mm^3$.

The porous nickel structure was placed in a tube furnace at 1370° C., heated for 10 hrs in the presence of argon, and then cooled along with the tube furnace. Then, the three-dimensional porous nickel structure was treated with sand-blasting by ceramic beads. After being performed with ultrasonic cleaning, a three-dimensional nickel template was acquired.

The three-dimensional porous nickel template was placed in a tube furnace and heated at a velocity of 100° C./min to 1000° C. in mixed gas flows of argon (180 mL/min) and $H_2$ (200 mL/min). After maintaining the temperature at 1000° C. for 30 min, styrene (0.254 mL/h) was introduced to the quartz tube for reaction for 1 hr. The introduction of $H_2$ was then shut off, and products were cooled in the presence of argon (50 mL/min) to room temperature to yield a three-dimensional graphene growing on a surface of the three-dimensional porous nickel template.

Thereafter, the three-dimensional porous nickel template with growing three-dimensional graphene was immersed in a hydrochloric acid solution having a concentration of 3 mol/L, the hydrochloric acid solution was refluxed at 80° C. until the three-dimensional porous nickel template was totally melted. A resulting product was washed and dried to yield a three-dimensional graphene porous structure. It was demonstrated from test results that the three-dimensional graphene completely repeated the shape of the porous nickel template.

Example 2

Firstly, a three-dimensional porous unit cell having a unit size of 1 mm was constructed, for example, adopting CAD software. An array of the unit cell is designed to be a periodic porous structure in an ordered arrangement having a porosity of 75%.

Thereafter, pure nickel powder having a particle size within a range of 30-50 μm was screened. The outline of the powder particle was approximately spherical. A fiber laser was adopted as an energy source. Parameters were set as follows: a laser power of 250 W, a scanning speed of 700 mm/s, a thickness of 0.02 mm, a scanning interval of 0.08 mm. In the presence of the argon, the direct metal laser sintering technique was adopted to form a three-dimension porous nickel structure having a dimension of 20×20×10 $mm^3$.

The porous nickel structure was placed in a tube furnace at 1370° C., heated for 12 hrs in the presence of argon, and then cooled along with the tube furnace. Then, the three-dimensional porous nickel structure was treated with sand-blasting by ceramic beads. After being performed with ultrasonic cleaning, a three-dimensional nickel template was acquired.

The three-dimensional porous nickel template was placed in a tube furnace and heated at a velocity of 100° C./min to 1000° C. in mixed gas flows of argon (180 mL/min) and $H_2$ (200 mL/min). After maintaining the temperature at 1000° C. for 45 min, styrene (0.508 mL/h) was introduced to the quartz tube for reaction for 0.5 hr. The introduction of $H_2$ was then shut off, and products were cooled in the presence of argon (50 mL/min) to room temperature to yield a three-dimensional graphene growing on a surface of the three-dimensional porous nickel template.

Thereafter, the three-dimensional porous nickel template with growing three-dimensional graphene was immersed in a hydrochloric acid solution having a concentration of 3 mol/L, the hydrochloric acid solution was refluxed at 60° C. until the three-dimensional porous nickel template was totally melted. A resulting product was washed and dried to yield a three-dimensional graphene porous structure. It was demonstrated from test results that the three-dimensional graphene completely repeated the shape of the porous nickel template.

Example 3

Firstly, a three-dimensional porous unit cell having a unit size of 1.5 mm was constructed, for example, adopting CAD software. An array of the unit cell is designed to be a periodic porous structure in an ordered arrangement having a porosity of 80%.

Thereafter, pure nickel powder having a particle size within a range of 10 -30 μm was screened. The outline of the powder particle was approximately spherical. A fiber laser was adopted as an energy source. Parameters were set as follows: a laser power of 300 W, a scanning speed of 600 mm/s, a thickness of 0.05 mm, a scanning interval of 0.1 mm. In the presence of the argon, the selective laser melting technique was adopted to form a three-dimension porous nickel structure having a dimension of 20×20×10 $mm^3$.

The porous nickel structure was placed in a tube furnace at 900° C., heated for 10 hrs in the presence of argon, and then cooled along with the tube furnace. Then, the three-dimensional porous nickel structure was treated with sand-blasting by ceramic beads. After being performed with ultrasonic cleaning, a three-dimensional nickel template was acquired.

The three-dimensional porous nickel template was placed in a tube furnace and heated at a velocity of 100° C./min to 1000° C. in mixed gas flows of argon (180 mL/min) and $H_2$ (200 mL/min) After maintaining the temperature at 1000° C. for 30 min, styrene (0.508 mL/h) was introduced to the quartz tube for reaction for 0.5 hr. The introduction of $H_2$ was then shut off, and products were cooled in the presence of argon (50 mL/min) to room temperature to yield a three-dimensional graphene growing on a surface of the three-dimensional porous nickel template.

Thereafter, the three-dimensional porous nickel template with growing three-dimensional graphene was immersed in a mixed solution of hydrochloric acid and sulfuric acid having a concentration of 2 mol/L, the mixed solution was refluxed at 90° C. until the three-dimensional porous nickel template was totally melted. A resulting product was washed and dried to yield a three-dimensional graphene porous structure. It was demonstrated from test results that the three-dimensional graphene completely repeated the shape of the porous nickel template.

Example 4

Firstly, a three-dimensional porous unit cell having a unit size of 1-3 mm was constructed, for example, adopting CAD software. An array of the unit cell is designed to be a periodic porous structure in an ordered arrangement having a porosity of 90%.

Thereafter, pure nickel powder having a particle size within a range of 5-10 μm was screened. The outline of the powder particle was approximately spherical. A fiber laser was adopted as an energy source. Parameters were set as follows: a vacuum quality of $5.0\times10^{-2}$ pascal, a scanning speed of 35 mm/s, a thickness of 0.02 mm, and a working current of 3 mA. In the presence of the argon, the electron beam melting technique was adopted to form a three-dimension porous nickel structure having a dimension of 20×20×10 $mm^3$.

The porous nickel structure was placed in a tube furnace at 1350° C., heated for 12 hrs in the presence of argon, and then cooled along with the tube furnace. Then, the three-dimensional porous nickel structure was treated with sand-blasting by ceramic beads. After being performed with ultrasonic cleaning, a three-dimensional nickel template was acquired.

The three-dimensional porous nickel template was placed in a tube furnace and heated at a velocity of 100° C./min to 1000° C. in mixed gas flows of argon (200 mL/min) and $H_2$ (200 mL/min) After maintaining the temperature at 1000° C. for 60 min, styrene (0.254 mL/h) was introduced to the quartz tube for reaction for 0.5 hr. The introduction of $H_2$ was then shut off, and products were cooled in the presence of argon (50 mL/min) to room temperature to yield a three-dimensional graphene growing on a surface of the three-dimensional porous nickel template.

Thereafter, the three-dimensional porous nickel template with growing three-dimensional graphene was immersed in an iron chloride solution having a concentration of 1 mol/L, the iron chloride solution was refluxed at 80° C. until the three-dimensional porous nickel template was totally melted. A resulting product was washed and dried to yield a three-dimensional graphene porous structure. It was demonstrated from test results that the three-dimensional graphene completely repeated the shape of the porous nickel template.

Example 5

Firstly, a three-dimensional porous unit cell having a unit size of 0.5-2 mm was constructed, for example, adopting CAD software. An array of the unit cell is designed to be a periodic porous structure in an ordered arrangement having a porosity of 70%.

Thereafter, pure nickel powder having a particle size within a range of 30-50 μm was screened. The outline of the powder particle was approximately spherical. A fiber laser was adopted as an energy source. Parameters were set as follows: a laser power of 300 W, a scanning speed of 600 mm/s, a thickness of 0.05 mm, and a scanning interval of 0.1 mm. In the presence of the argon, the selective laser melting technique was adopted to form a three-dimension porous nickel structure having a dimension of 20×20×10 $mm^3$.

The porous nickel structure was placed in a tube furnace at 1200° C., heated for 12 hrs in the presence of argon, and then cooled along with the tube furnace. Then, the three-dimensional porous nickel structure was treated with sand-blasting by ceramic beads. After being performed with ultrasonic cleaning, a three-dimensional nickel template was acquired.

The three-dimensional porous nickel template was placed in a tube furnace and heated at a velocity of 100° C./min to 1000° C. in mixed gas flows of argon (150 mL/min) and $H_2$ (250 mL/min). After maintaining the temperature at 1000° C. for 60 min, methane (100 mL/h) was introduced to the quartz tube for reaction for 0.5 hr. The introduction of $H_2$ was then shut off, and products were cooled in the presence of argon (50 mL/min) to room temperature to yield a three-dimensional graphene growing on a surface of the three-dimensional porous nickel template.

Thereafter, the three-dimensional porous nickel template with growing three-dimensional graphene was immersed in an iron chloride solution having a concentration of 1.5 mol/L, the iron chloride solution was refluxed at 80° C. until the three-dimensional porous nickel template was totally melted. A resulting product was washed and dried to yield a three-dimensional graphene porous structure. It was demonstrated from test results that the three-dimensional graphene completely repeated the shape of the porous nickel template.

Example 6

Firstly, a three-dimensional porous unit cell having a unit size of 2 mm was constructed, for example, adopting CAD software. An array of the unit cell is designed to be a periodic porous structure in an ordered arrangement having a porosity of 50%.

Thereafter, pure nickel powder having a particle size within a range of 20-30 μm was screened. The outline of the powder particle was approximately spherical. A fiber laser was adopted as an energy source. Parameters were set as follows: a laser power of 3000 W, a scanning speed of 600 mm/s, a thickness of 0.03 mm, and a scanning interval of 0.08 mm. In the presence of the argon, the direct metal laser sintering technique was adopted to form a three-dimension porous nickel structure having a dimension of 20×20×10 $mm^3$.

The porous nickel structure was placed in a tube furnace at 900° C., heated for 24 hrs in the presence of argon, and then cooled along with the tube furnace. Then, the three-dimensional porous nickel structure was treated with sand-blasting by ceramic beads. After being performed with ultrasonic cleaning, a three-dimensional nickel template was acquired.

The three-dimensional porous nickel template was placed in a tube furnace and heated at a velocity of 100° C./min to 1000° C. in mixed gas flows of argon (120 mL/min) and $H_2$ (250 mL/min). After maintaining the temperature at 1000° C. for 45 min, styrene (0.508 mL/h) was introduced to the quartz tube for reaction for 0.5 hr. The introduction of $H_2$ was then shut off, and products were cooled in the presence of argon (50 mL/min) to room temperature to yield a three-dimensional graphene growing on a surface of the three-dimensional porous nickel template.

Thereafter, the three-dimensional porous nickel template with growing three-dimensional graphene was immersed in a hydrochloric acid solution having a concentration of 3 mol/L, the hydrochloric acid solution was refluxed at 60° C. until the three-dimensional porous nickel template was totally melted. A resulting product was washed and dried to yield a three-dimensional graphene porous structure. It was demonstrated from test results that the three-dimensional graphene completely repeated the shape of the porous nickel template.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for preparing a three-dimensional porous graphene material, the method comprising:

a) constructing a CAD model corresponding to a required three-dimensional porous structure, and designing an external shape and internal structure parameters of the model comprising a pore size, a porosity, and a pore shape, respectively;

b) based on the CAD model constructed in a), preparing, by using additive manufacturing in the presence of an inert gas, a three-dimensional porous metal structure having a shape corresponding to that of the CAD model with a metal powder as material, wherein, the metal powder is nickel, copper, iron, or cobalt, an average particle size of the metal powder is 5-50 μm, and a particle shape of the metal powder is spherical or approximately spherical;

c) heating the three-dimensional porous metal structure to a temperature of 900° C.-1500° C. for 4-24 hrs in the presence of the inert gas, cooling the three-dimensional porous metal structure to room temperature; performing sand blasting and ultrasonic cleaning on the three-dimensional porous metal structure, to acquire a metal template of the required three-dimensional porous structure;

d) placing the metal template in a tube furnace in the presence of mixed gases of the inert gas and hydrogen and heating the metal template to 800-1000° C.; standing for 0.5-1 hr, introducing a carbon source to the tube furnace for continued reaction, cooling resulting products to room temperature in the presence of the inert gas, to yield a three-dimensional graphene grown on the metal template; and e) preparing a corrosive solution having a molar concentration of 1-3 mol/L; immersing the three-dimensional graphene prepared in d) in the corrosive solution, refluxing the corrosive solution at 60-90° C. until the metal template is completely melted; washing and drying the three-dimensional graphene to yield a three-dimensional porous graphene material, wherein, internal structure parameters comprising a pore size, a porosity, and a pore shape and external shape of the three-dimensional porous graphene material are the same as those of the CAD model constructed in a).

2. The method of claim 1, wherein in a), the CAD model is a periodic ordered porous structure or an interconnected disordered three-dimensional porous structure, a unit dimension thereof is between 0.5-10 mm, and a porosity is adjustable within a range of 20-90%.

3. The method of claim 1, wherein the additive manufacturing in b) comprises selective laser melting technique, direct metal laser sintering technique, or electron beam melting technique; and an average particle size of the metal powder is controlled within 10-30 μm.

4. The method of claim 2, wherein the additive manufacturing in b) comprises selective laser melting technique, direct metal laser sintering technique, or electron beam melting technique; and an average particle size of the metal powder is controlled within 10-30 μm.

5. The method of claim 3, wherein in c), the three-dimensional porous metal structure is heated to 1200-1370° C. in the presence of argon, maintained for 12 hrs, and then cooled to room temperature.

6. The method of claim 4, wherein in c), the three-dimensional porous metal structure is heated to 1200-1370° C. in the presence of argon, maintained for 12 hrs, and then cooled to room temperature.

7. The method of claim 1, wherein in d), the carbon source is selected from the group consisting of styrene, methane, and ethane; a flow rate of the carbon source is controlled at 0.2-200 mL/h; and a charging time of the carbon source lasts for 0.5-3 hrs.

8. The method of claim 6, wherein in d), the carbon source is selected from the group consisting of styrene, methane, and ethane; a flow rate of the carbon source is controlled at 0.2-200 mL/h; and a charging time of the carbon source lasts for 0.5-3 hrs.

9. The method of claim 1, wherein the inert gas is argon, a volume ratio of the argon to the hydrogen is between 1:1 and 3:1; in the mixed gases of the argon and the hydrogen, a flow rate of the argon is controlled at 100-200 mL/min, and a flow rate of the hydrogen is controlled at 180-250 mL/min.

10. The method of claim 8, wherein the inert gas is argon, a volume ratio of the argon to the hydrogen is between 1:1 and 3:1; in the mixed gases of the argon and the hydrogen, a flow rate of the argon is controlled at 100-200 mL/min, and a flow rate of the hydrogen is controlled at 180-250 mL/min.

11. The method of claim 1, wherein in e), the corrosive solution is selected from the group consisting of hydrochloric acid, sulfuric acid, nitric acid, iron chloride, and a mixture thereof.

12. The method of claim 10, wherein in e), the corrosive solution is selected from the group consisting of hydrochloric acid, sulfuric acid, nitric acid, iron chloride, and a mixture thereof.

* * * * *